(12) United States Patent
Ishizu et al.

(10) Patent No.: US 11,911,804 B2
(45) Date of Patent: Feb. 27, 2024

(54) TRANSFER SUBSTRATE RECYCLING APPARATUS AND TRANSFER SUBSTRATE RECYCLING METHOD

(71) Applicant: TOYOTA JIDOSHA KABUSHIKI KAISHA, Toyota (JP)

(72) Inventors: Seiji Ishizu, Toyota (JP); Yoshio Takakuwa, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 243 days.

(21) Appl. No.: 17/358,631

(22) Filed: Jun. 25, 2021

(65) Prior Publication Data

US 2022/0111425 A1   Apr. 14, 2022

(30) Foreign Application Priority Data

Oct. 14, 2020 (JP) .................. 2020-173202

(51) Int. Cl.
| | |
|---|---|
| B08B 1/04 | (2006.01) |
| B08B 7/00 | (2006.01) |
| B08B 13/00 | (2006.01) |
| B08B 1/02 | (2006.01) |
| B65G 15/32 | (2006.01) |
| H01M 4/88 | (2006.01) |

(52) U.S. Cl.
CPC .................. *B08B 1/04* (2013.01); *B08B 1/02* (2013.01); *B08B 7/0028* (2013.01); *B08B 13/00* (2013.01); *B65G 15/32* (2013.01); *H01M 4/881* (2013.01); *H01M 4/8825* (2013.01)

(58) Field of Classification Search
CPC ................................ B60S 1/04; B60S 7/0028
See application file for complete search history.

(56) References Cited

FOREIGN PATENT DOCUMENTS

JP         2003-036009 A       2/2003

*Primary Examiner* — Andrew A Horton
(74) *Attorney, Agent, or Firm* — Sughrue Mion, PLLC

(57) ABSTRACT

A transfer substrate recycling apparatus is a transfer substrate recycling apparatus including: a first pass line in which an elongated belt-shaped transfer substrate is unwound and conveyed; a second pass line in which an elongated belt-shaped self-adhesive film is unwound and conveyed; a controlling portion configured to control the conveyance of the transfer substrate; a first removal portion provided in the first pass line, the first removal portion being configured to remove an impurity on the transfer substrate by transferring the impurity onto the self-adhesive film; an inspection portion provided on a downstream side from the first removal portion in the first pass line, the inspection portion being configured to inspect a surface of the transfer substrate; and a second removal portion provided in the first pass line, the second removal portion being configured to remove a residual impurity detected by the inspection portion.

6 Claims, 6 Drawing Sheets

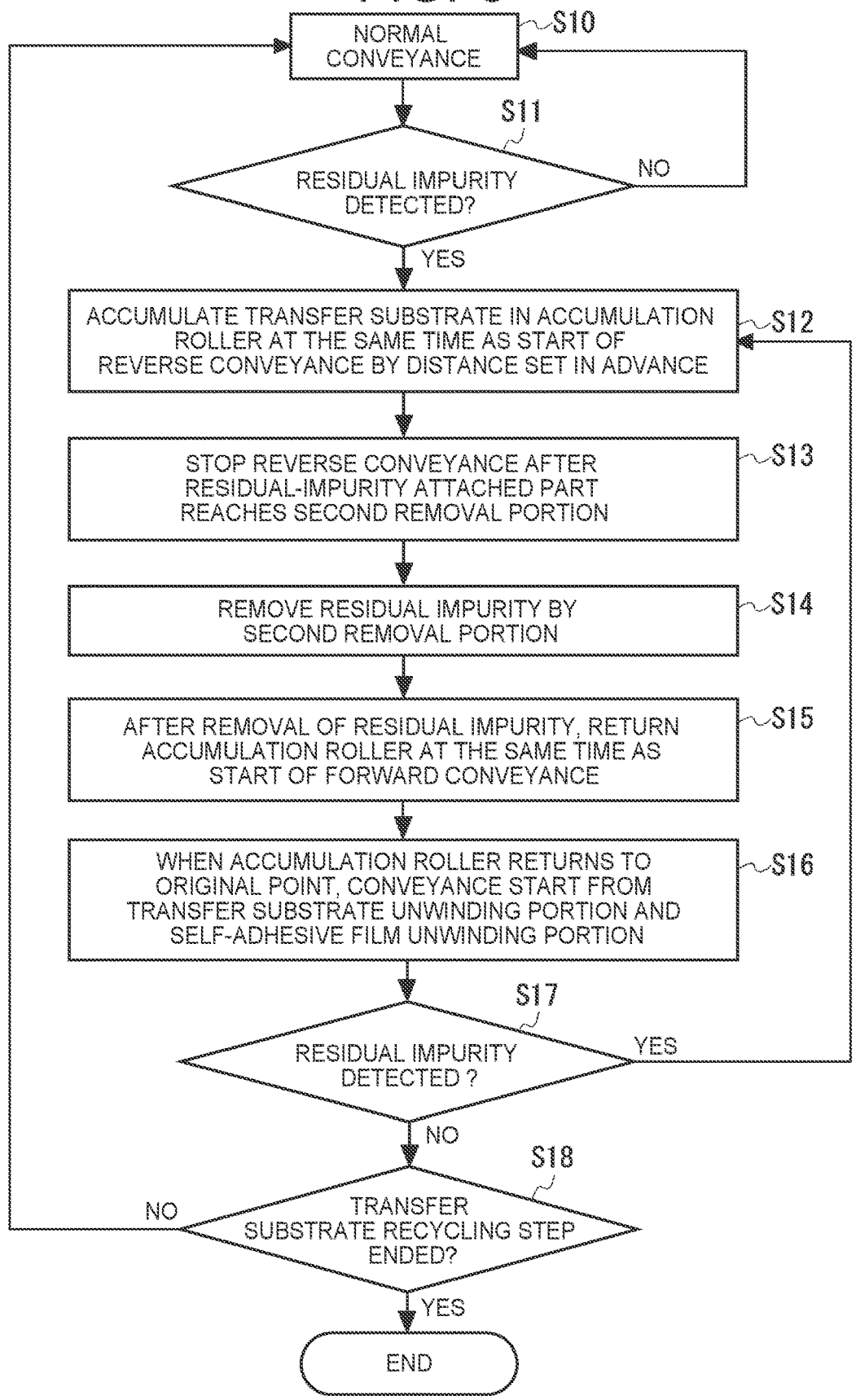

TRANSFER SUBSTRATE RECYCLING APPARATUS AND TRANSFER SUBSTRATE RECYCLING METHOD

CROSS-REFERENCE TO RELATED APPLICATION

This application claims priority to Japanese Patent Application No. 2020-173202 filed on Oct. 14, 2020, incorporated herein by reference in its entirety.

BACKGROUND

1. Technical Field

The present disclosure relates to a transfer substrate recycling apparatus and a transfer substrate recycling method.

2. Description of Related Art

Japanese Unexamined Patent Application Publication No. 2003-036009 (JP 2003-036009 A) describes a transfer material recycling apparatus configured to remove coloring agent from a transfer material such that the coloring agent is transferred onto a stripping roller by sandwiching the coloring agent printed on the transfer material between nip portions of the stripping roller and a pressure roller. The stripping roller and the pressure roller are provided as a pair. The sectional shape of the transfer material between the nip portions of the stripping roller and the pressure roller projects toward the stripping roller side. Hereby, the transfer material can be separated from the stripping roller without a separation pawl, thereby preventing the transfer material from getting dirt by dirt accumulated in the separation pawl.

SUMMARY

In a manufacturing step of manufacturing a membrane electrode assembly of a fuel cell, a catalyst layer is formed on an electrolyte membrane by transferring a catalyst onto the electrolyte membrane, the catalyst being applied to a transfer substrate such as polytetrafluoroethylene (PTFE). After the transfer, the catalyst that has not been transferred may remain on the transfer substrate having a roll shape. In order to recycle the transfer substrate, it is necessary to peel the catalyst on the transfer substrate by a self-adhesive film or the like.

However, in a case where the catalyst is peeled from the transfer substrate by the self-adhesive film, there is such a problem that, when a large amount of the catalyst remains on the transfer substrate, the catalyst may not be removed completely.

The present disclosure has been accomplished in consideration of such a problem and is intended to surely remove an impurity remaining on a transfer substrate.

A transfer substrate recycling apparatus according to one aspect of the present disclosure is a transfer substrate recycling apparatus including a first pass line, a second pass line, a controlling portion, a first removal portion, an inspection portion, and a second removal portion. In the first pass line, an elongated belt-shaped transfer substrate wound in a roll shape is unwound and conveyed. In the second pass line, an elongated belt-shaped adhesive material wound in a roll shape is unwound and conveyed. The controlling portion is configured to control the conveyance of the transfer substrate. The first removal portion is provided in the first pass line, the first removal portion being configured to remove an impurity on the transfer substrate by transferring the impurity onto the adhesive material such that the adhesive material is brought into contact with the transfer substrate. The inspection portion is provided on the downstream side from the first removal portion in the first pass line, the inspection portion being configured to inspect a surface of the transfer substrate. The second removal portion is provided in the first pass line, the second removal portion being configured to remove a residual impurity detected by the inspection portion.

A transfer substrate recycling method according to one aspect of the present disclosure is a transfer substrate recycling method including: unwinding and conveying, in a first pass line, an elongated belt-shaped transfer substrate wound in a roll shape; unwinding and conveying, in a second pass line, an elongated belt-shaped adhesive material wound in a roll shape; removing an impurity on the transfer substrate by a first removal portion in the first pass line by transferring the impurity onto the adhesive material such that the adhesive material is brought into contact with the transfer substrate; inspecting a surface of the transfer substrate by an inspection portion in the first pass line after the removing of the impurity by the first removal portion; and removing a residual impurity by a second removal portion in the first pass line when the residual impurity is detected, the second removal portion being different from the first removal portion.

With the present disclosure, it is possible to surely remove an impurity remaining on the transfer substrate.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flow diagram illustrating a transfer substrate recycling method according to the embodiment;

DETAILED DESCRIPTION OF EMBODIMENTS

Figure 1:
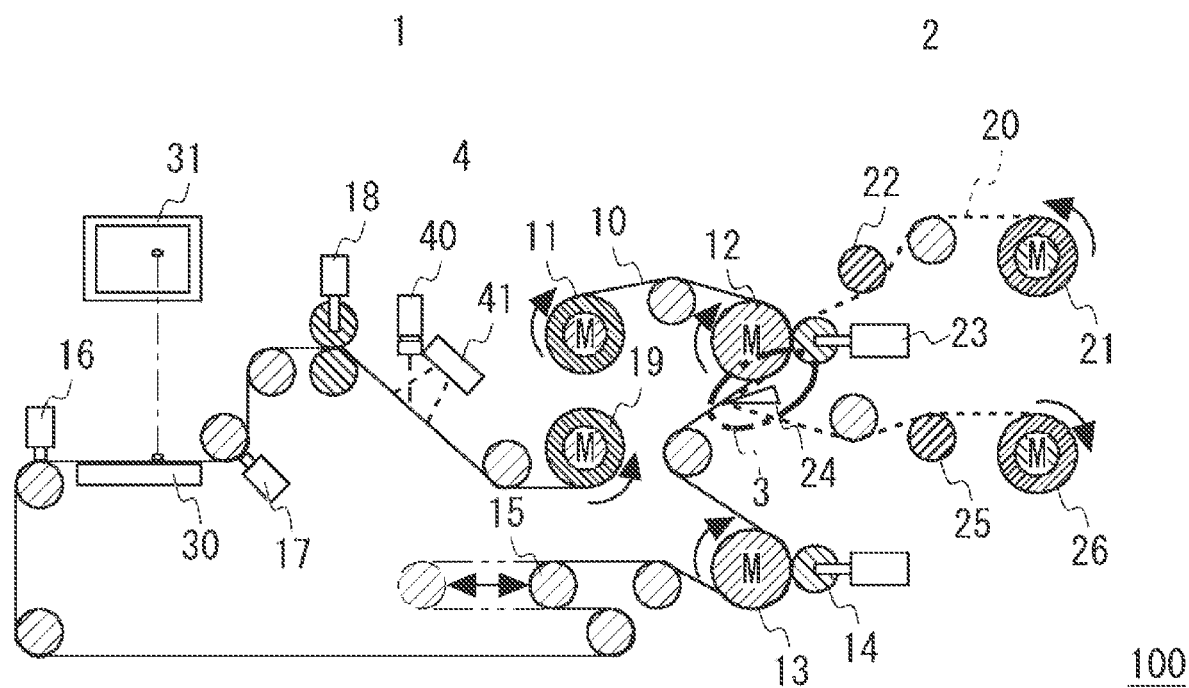
FIG. 1 is a schematic diagram illustrating a configuration of a transfer substrate recycling apparatus according to an embodiment.

With reference to the drawings, the following describes an embodiment of the present disclosure. Constituents equivalent to each other in the drawings have the same reference sign, and redundant descriptions are omitted.

A fuel cell is manufactured by laminating a plurality of cells of the fuel cell. The cell of the fuel cell includes a membrane electrode gas diffusion layer assembly (MEGA), a cathode-side separator, and an anode-side separator. The MEGA includes a membrane electrode assembly (MEA), an anode-side gas diffusion layer (GDL), and a cathode-side GDL. The MEA is a joined body of an electrolyte membrane, a cathode-side catalytic layer, and an anode-side catalytic layer.

At the time of manufacturing the MEA for the fuel cell, in a step of forming a catalyst layer, a catalyst is intermittently applied to a roll-shaped transfer substrate and then dried, and after the catalyst is transferred onto an electrolyte membrane by use of a heating roller, the catalyst is cooled down. As the transfer substrate, polytetrafluoroethylene (PTFE) is used. Note that, as the transfer substrate, a substrate in which a release layer is formed on the surface of PTFE may be used. As the release layer, a polyolefin-based release material can be used. An application method for applying the catalyst to the transfer substrate and a drying method for drying the catalyst are not limited in particular.

In some cases, the catalyst may remain on the transfer substrate after the catalyst is transferred, or the surface of the transfer substrate may become uneven due to the heating roller at the time of the transfer. In order to reuse PTFE that is expensive, it is conceivable that a transfer substrate recycling step is provided such that a self-adhesive film is attached to the transfer substrate, and the catalyst remaining on the surface of the transfer substrate is removed by being transferred onto the film side.

However, in a case where a large amount of the catalyst remains on the surface of the transfer substrate, the catalyst may not be removed by the self-adhesive film, and this poses a problem that the quality of a recycled transfer substrate cannot be secured. Such a catalyst residue that cannot be removed by the self-adhesive film is easily caused particularly when a facility urgently stops due to the occurrence of abnormality in a catalyst transferring step.

More specifically, such a case is conceivable that, in a part staying, at the time of an emergency stop, in an area between the outlet of the heating roller and a point where the transfer substrate is peeled, the catalyst remains on the transfer substrate side without completely peeling off from the transfer substrate after the facility is restarted. Further, in the transferring step, when a starting end of the catalyst applied intermittently deviates from a starting end of an electrolyte membrane onto which the catalyst is to be transferred, the catalyst remains on the transfer substrate.

In view of this, the inventors of the present disclosure have devised a technique to surely remove an impurity remaining on a transfer substrate. The following describes an example in which a catalyst remaining on a transfer substrate after the catalyst is transferred onto an electrolyte membrane is removed as an impurity. Note that the transfer substrate and the impurity described herein are examples, and the present disclosure is not limited to this. Further, the catalyst applied to the transfer substrate can be transferred to a gas diffusion layer (GDL).

FIG. 1 is a schematic view illustrating a configuration of a transfer substrate recycling apparatus 100 according to the embodiment. As illustrated in FIG. 1, the transfer substrate recycling apparatus 100 includes a first pass line 1 in which a transfer substrate 10 is conveyed, and a second pass line 2 in which a self-adhesive film 20 is conveyed. The transfer substrate recycling apparatus 100 includes a first removal portion 3, a second removal portion 30, and an inspection portion 4 in a feed path order of the first pass line 1. In the present embodiment, in the transfer substrate recycling step, in order to surely remove the catalyst remaining on the transfer substrate 10, the second removal portion 30 and the inspection portion 4 are further provided after a residue on the transfer substrate 10 is removed by the self-adhesive film 20.

Note that, in FIG. 1, driven rollers rotationally driven by driving devices such as servomotors (not illustrated) are indicated by "M." That is, a transfer substrate unwinding portion 11, a laminating roller 12, a feed roller 13, a transfer substrate winding portion 19, a self-adhesive film unwinding portion 21, and a self-adhesive film winding portion 26 serve as the driven rollers. The transfer substrate unwinding portion 11, the laminating roller 12, the feed roller 13, and the transfer substrate winding portion 19 serve as controlling portions configured to control the conveyance of the transfer substrate 10. Further, the self-adhesive film unwinding portion 21 and the self-adhesive film winding portion 26 serve as controlling portions configured to control the conveyance of the self-adhesive film 20.

Further, no drive source is provided for free rollers configured to guide the transfer substrate 10 or the self-adhesive film 20, and no reference sign is given thereto in the drawings. The rollers are set such that their respective shafts are parallel to each other. Respective roller surfaces of a non-adhesion roller 22 and a non-adhesion roller 25 among the free rollers in the second pass line 2 are subjected to a special surface treatment so that an adhesive material on the self-adhesive film 20 does not stick to the roller surfaces. The surface treatment may be performed such that, after a satin process is performed on the roller surfaces by shot blasting, the roller surfaces are coated with fluorine, for example.

Herein, the laminating roller 12 in the first removal portion 3 is used as a master roll. The driven rollers control the tension of the transfer substrate 10 or the self-adhesive film 20 in five tension areas while rotation speeds of the rollers are changed. The five tension areas include an area between the transfer substrate unwinding portion 11 and the laminating roller 12, an area between the laminating roller 12 and the feed roller 13, an area between the feed roller 13 and the transfer substrate winding portion 19, an area between the self-adhesive film unwinding portion 21 and a stripper bar 24, and an area between the stripper bar 24 and the self-adhesive film winding portion 26.

The transfer substrate unwinding portion 11 pivotally supports a transfer substrate roll in an unwinding manner. The transfer substrate roll has a feeding shaft, and the elongated belt-shaped transfer substrate 10 which has been subjected to a transferring step and on which a catalyst remains is wound around the feeding shaft in a roll shape. Further, the self-adhesive film unwinding portion 21 pivotally supports a self-adhesive film roll in an unwinding manner. The self-adhesive film roll has a feeing shaft, and the elongated belt-shaped self-adhesive film 20 provided with an adhesive material on a film backing is wound around the feeding shaft in a roll shape.

The first removal portion 3 is provided on the downstream side from the transfer substrate unwinding portion 11 and the self-adhesive film unwinding portion 21. The first removal portion 3 includes the laminating roller 12, a pressing roller 23, and the stripper bar 24. The laminating roller 12 and the pressing roller 23 are provided so as to laminate the transfer substrate 10 unwound from the transfer substrate unwinding portion 11 to the self-adhesive film 20 unwound from the self-adhesive film unwinding portion 21.

The pressing roller 23 is constituted by an elastic body such as rubber, for example. By the pressing force from the pressing roller 23, air staying between the transfer substrate 10 and the self-adhesive film 20 is expelled out, so that the transfer substrate 10 and the self-adhesive film 20 can be laminated to each other without being brought into a wrinkled state. The stripper bar 24 is provided so as to separate the transfer substrate 10 laminated to the self-adhesive film 20 from the self-adhesive film 20.

Figure 2:
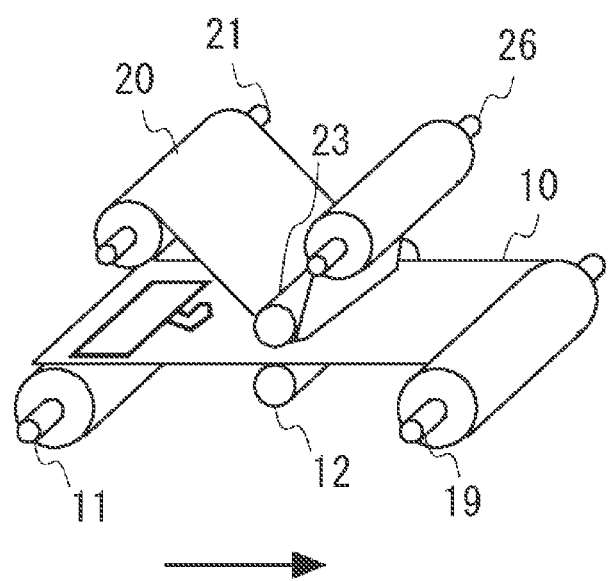
FIG. 2 is a view to describe a step of peeling an impurity on the transfer substrate.

FIG. 2 is a view to describe a step of peeling an impurity on the transfer substrate 10. As illustrated in FIG. 2, by bringing the self-adhesive film 20 into contact with the transfer substrate 10, the catalyst on the transfer substrate 10 can be removed by being transferred onto the self-adhesive film 20 side. The self-adhesive film 20 separated from the transfer substrate 10 is then wound up around the self-adhesive film winding portion 26.

In the present embodiment, in order to remove a residual impurity remaining on the transfer substrate 10 after the transfer substrate 10 has passed through the first removal portion 3, the second removal portion 30 and the inspection portion 4 are provided. On the downstream side from the first removal portion 3, the feed roller 13, an accumulation roller 15, a nip 16, the second removal portion 30, a nip 17, a cleaner roll 18, and the transfer substrate winding portion 19 are provided in the feed path order of the first pass line 1. The feed roller 13 conveys the transfer substrate 10 peeled from the self-adhesive film 20 to the downstream side by sandwiching the transfer substrate 10 between the feed roller 13 and a nip roller 14.

In the example illustrated in FIG. 1, the second removal portion 30 is provided on the downstream side from the first removal portion 3, and the inspection portion 4 is provided on the downstream side from the second removal portion 30. On this account, after the transfer substrate 10 is peeled from the self-adhesive film 20 by the stripper bar 24, the transfer substrate 10 is passed through the second removal portion 30 and reaches the inspection portion 4. Accordingly, when a residual impurity is detected by the inspection portion 4, the transfer substrate 10 is conveyed in a reverse direction so that a part, of the transfer substrate 10, where the residual impurity is detected is moved to the second removal portion 30.

When the transfer substrate 10 is conveyed in the reverse direction, an area (an area where the first removal portion 3 is provided) where the transfer substrate 10 is laminated to the self-adhesive film 20 is also conveyed reversely, so that the self-adhesive film 20 is laminated again to the recycled transfer substrate 10. Here, there is such a concern that the catalyst transferred onto the self-adhesive film 20 side may be reattached to the transfer substrate 10.

In view of this, in the present embodiment, the accumulation roller 15 is provided on the downstream side from the first removal portion 3 but on the upstream side from the inspection portion 4 and the second removal portion 30. When the transfer substrate 10 is conveyed in the reverse direction, the accumulation roller 15 moves to change a conveyance path length so that the transfer substrate 10 is accumulated in the accumulation roller 15.

That is, when the transfer substrate 10 is conveyed in the reverse direction, the accumulation roller 15 moves so that the conveyance path length of the transfer substrate 10 is extended. The amount of the transfer substrate 10 thus conveyed in the reverse direction is accumulated in the conveyance path thus extended. This makes it possible to prevent the peeled self-adhesive film 20 from being laminated to the recycled transfer substrate 10 again.

The cleaner roll 18 is provided right before the inspection portion 4. The cleaner roll 18 removes dust attached to the front and back surfaces of the transfer substrate 10 just before it is inspected by the inspection portion 4. Hereby, the catalyst which remains on the transfer substrate 10 and which should be removed by the second removal portion 30 can be easily found. Note that a removal mechanism for removing dust attached to the transfer substrate 10 may be provided other than the cleaner roll 18, or the cleaner roll 18 may not be provided when unnecessary.

The inspection portion 4 inspects whether the catalyst (a residual impurity) remains on the surface of the transfer substrate 10 or not. The inspection portion 4 includes a camera 40 and a lighting device 41. An inspection target region of the transfer substrate 10 is illuminated by the lighting device 41, and an image of the inspection target region is captured by the camera 40. The image thus captured is subjected to an imaging process by an image processor (not illustrated), for example, and presence or absence of a residual impurity is determined.

When the residual impurity is detected by the inspection portion 4, the transfer substrate 10 is conveyed in the reverse direction so that a part to which the residual impurity is attached is moved to the second removal portion 30 through which the part has passed once. In the second removal portion 30, the remaining catalyst is removed.

In the second removal portion 30, the remaining catalyst can be removed by wiping off the remaining catalyst with dry waste cloth or waste cloth containing water or alcohol such as ethanol, for example. Note that a tray filled with water may be provided near a work table, and the catalyst thus wiped off may be collected. Further, the second removal portion 30 is provided with a status monitor 31. The captured image of the part, of the transfer substrate 10, to which the residual impurity is attached is displayed on the status monitor 31. An operator can remove the residual impurity while the operator is checking the status monitor 31.

The second removal portion 30 is provided with a work table (not illustrated) made of translucent glass or resin. The transfer substrate 10 conveyed in the reverse direction stops at a position where the part to which the residual impurity is attached is placed on the work table. A cleaning surface of the transfer substrate 10 to which the residual impurity is attached is placed on a surface side (the front surface side), of the transfer substrate 10, that does not face the work table.

Further, the second removal portion 30 is provided with a lighting source (not illustrated) configured to apply light to the cleaning surface of the transfer substrate 10 from the back surface side of the cleaning surface. In the present embodiment, the transfer substrate 10 is PTFE and has translucency. Accordingly, when the transfer substrate 10 is irradiated with the light from the lighting source, the black catalyst remaining on the transfer substrate 10 can be easily determined. Note that, in a case where the transfer substrate 10 does not have translucency, the transfer substrate 10 may be irradiated with light from its front surface side.

As the lighting source, a lighting source that can uniformly apply light to a region, of the transfer substrate 10 on the work table, from which the residual impurity is removed can be used. For example, as the lighting source, a lighting source in which a plurality of point light sources is arranged on a plurality of lines at regular intervals in a grid manner, a surface light source including one or more light sources, a light guiding plate configured to diffusely reflect light emitted from the one or more light sources, and so on, and other light sources can be used. Types of the light sources include, for example, a fluorescent lamp, a light emitting diode (LED), an organic light-emitting diode (OLED), and so on.

After the residual impurity is removed in the second removal portion 30, the part, of the transfer substrate 10, where the residual impurity has been detected is passed through the cleaner roll 18 and then the inspection portion 4 again. By executing inspection by the inspection portion 4 again, it is possible to check that the impurity remaining on the transfer substrate 10 has been surely removed.

Figure 4A:
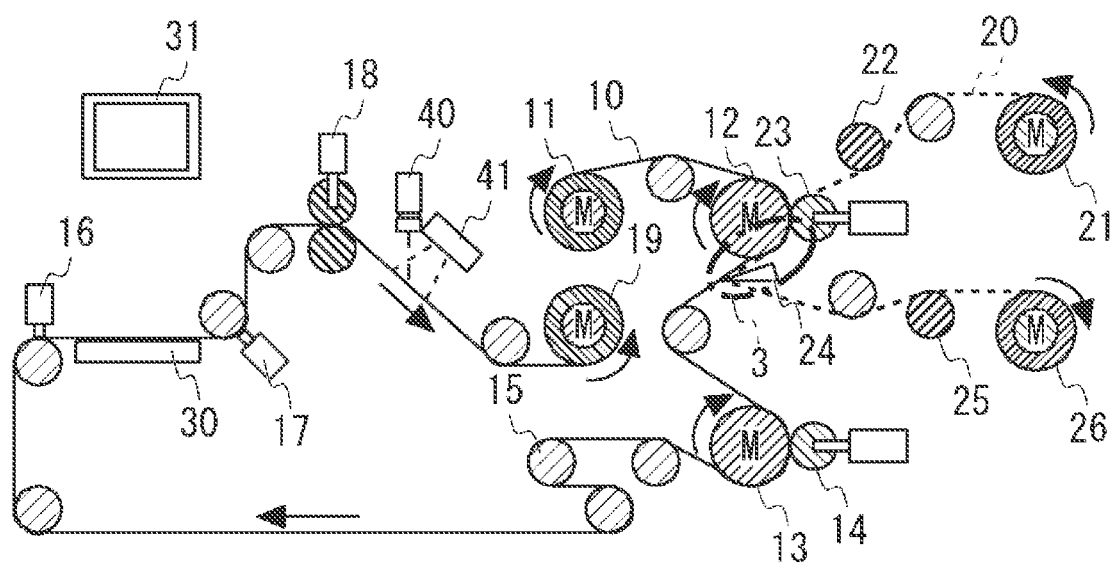
FIG. 4A is a view to describe operations of the transfer substrate recycling apparatus in respective steps in FIG. 3.
Figure 4B:
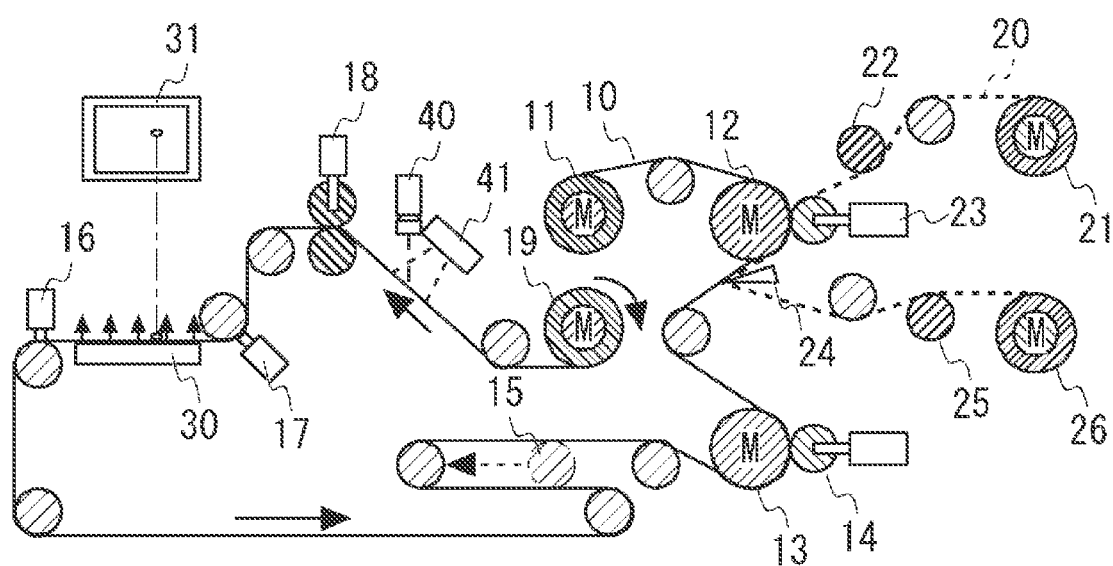
FIG. 4B is a view to describe operations of the transfer substrate recycling apparatus in respective steps in FIG. 3.
Figure 4C:
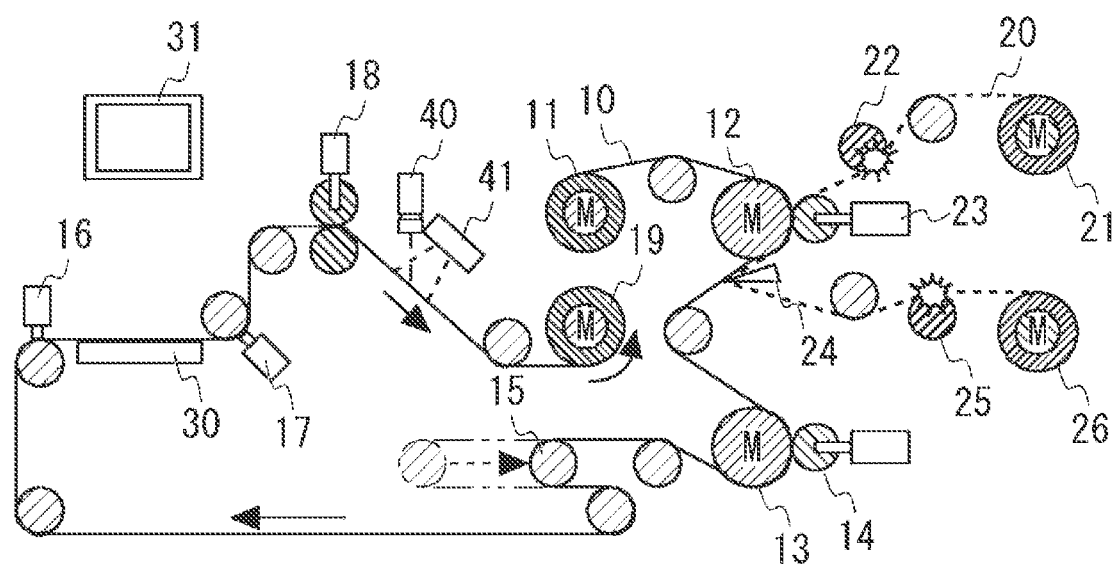
FIG. 4C is a view to describe operations of the transfer substrate recycling apparatus in respective steps in FIG. 3.

The following describes a transfer substrate recycling method according to the embodiment, with reference to FIG. 3 and FIGS. 4A to 4C. FIG. 3 is a flow diagram illustrating the transfer substrate recycling method according to the embodiment. FIGS. 4A to 4C are views to describe operations of the transfer substrate recycling apparatus in respective steps in FIG. 3.

As illustrated in step S10 in FIG. 3, at the time of normal conveyance, the transfer substrate 10 and the self-adhesive film 20 are conveyed in respective directions indicated by arrows in FIG. 4A. At this time, the catalyst on the transfer substrate 10 is removed in the first removal portion 3.

After that, the surface of the transfer substrate 10 is inspected by the inspection portion 4, and it is determined whether a residual impurity is detected or not (step S11). When the residual impurity is not detected (step S11, NO), the process returns to step S10, so that the normal conveyance is continued. In the meantime, when the residual impurity is detected (step S11, YES), the conveyance of the transfer substrate 10 in a forward direction is slowed down to stop, and the transfer substrate 10 is conveyed in the reverse direction by a distance set in advance. At the same time, the accumulation roller 15 is moved to extend the conveyance path, so that the transfer substrate 10 is accumulated (step S12).

As illustrated in FIG. 4B, the transfer substrate 10 is conveyed in the reverse direction indicated by continuous-line arrows. Further, by moving the accumulation roller 15 along a broken-line arrow from a position indicated by a broken line to a position indicated by a continuous line, it is possible to extend the conveyance path of the transfer substrate 10. Hereby, the amount of returning of the transfer substrate 10 in the reverse direction can be accumulated in the accumulation roller 15. At this time, the transfer substrate unwinding portion 11 and the self-adhesive film unwinding portion 21 are brought into a stop state.

After a part, of the transfer substrate 10, to which the residual impurity is attached reaches the second removal portion 30, the conveyance of the transfer substrate 10 in the reverse direction is stopped (step S13). Then, the residual impurity is removed in the second removal portion 30 (step S14). After the residual impurity is removed, the conveyance of the transfer substrate 10 in the forward direction is started, and at the same time, the accumulation roller 15 is returned (step S15).

As illustrated in FIG. 4C, the transfer substrate 10 is conveyed in the forward direction indicated by continuous-line arrows. Further, by moving the accumulation roller 15 along a broken-line arrow from a position indicated by a broken line to a position indicated by a continuous line, it is possible to shorten the conveyance path of the transfer substrate 10. Hereby, the transfer substrate 10 accumulated in the accumulation roller 15 can be sent out. The conveyance in the forward direction can be started when the operator presses a button indicative of removal completion of the residual impurity, for example. At this time, the transfer substrate unwinding portion 11 and the self-adhesive film unwinding portion 21 are kept in the stop state.

After the accumulation roller 15 returns to its original position, the conveyance of the transfer substrate 10 from the transfer substrate unwinding portion 11 and the conveyance of the self-adhesive film 20 from the self-adhesive film unwinding portion 21 are started (step S16). In step S16, more specifically, when the accumulation roller 15 returns to its original position, the conveyance of the transfer substrate 10 is stopped temporarily. Then, after respective tensile forces in the tensile areas are adjusted to set values, the transfer substrate 10 and the self-adhesive film 20 are sent out from the transfer substrate unwinding portion 11 and the self-adhesive film unwinding portion 21, respectively.

In terms of the part, of the transfer substrate 10, where the residual impurity has been detected, the residual impurity is removed in the second removal portion 30, and after that, the part of the transfer substrate 10 is passed through the cleaner roll 18 and then through the inspection portion 4 again, so that the part is inspected by the inspection portion 4 (step S17). Note that, when the residual impurity is detected again in the reinspection (step S17, YES), the process returns to S12, and the same operations are repeated.

When the residual impurity is not detected in the reinspection (step S17, NO), it is determined whether or not the transfer substrate recycling step is ended (step S18). There are two conceivable patterns for ending of the transfer substrate recycling step, for example. The first pattern is as follows. That is, the length of a part, of the transfer substrate 10, from which the impurity has been removed is calculated based on an encoder value of the transfer substrate winding portion 19, and when the length thus calculated reaches its target value, the transfer substrate recycling step is ended. The second pattern is as follows. That is, the roll diameters of the transfer substrate unwinding portion 11 and the self-adhesive film unwinding portion 21 are measured, and when either one of the roll diameters becomes smaller than a predetermined value, the transfer substrate recycling step is ended. When an affirmative determination (YES) is made in step S18, the transfer substrate recycling step is ended, and when a negative determination (NO) is made in step S18 and the transfer substrate recycling step is not ended, the normal conveyance is restarted (step S10, FIG. 4A).

As described above, in the embodiment, in the transfer substrate recycling step, when a residual impurity remains as a result of the inspection by the inspection portion 4 after the catalyst remaining on the transfer substrate is peeled by the self-adhesive film, the transfer substrate is conveyed reversely. Then, after the residual impurity is removed, the surface of the transfer substrate 10 is inspected again. Hereby, the catalyst can be removed surely, thereby making it possible to improve the quality of the recycled transfer substrate 10.

Note that the present disclosure is not limited to the above embodiment, and various modifications can be made within a range that does not deviate from the gist of the present disclosure. For example, in the embodiment, the inspection portion 4 is provided on the downstream side from the second removal portion 30. However, the inspection portion 4 may be provided on the upstream side from the second removal portion 30. In a case where the cleaner roll 18 is provided, the cleaner roll 18 is provided right before the inspection portion 4.

In this case, the transfer substrate 10 inspected by the inspection portion 4 is conveyed in the forward direction and is sent to the second removal portion 30. After the residual impurity is removed in the second removal portion 30, the transfer substrate 10 is conveyed in the reverse direction, so that the part where the residual impurity has been detected is moved to the inspection portion 4 again. Further, for example, after the catalyst is removed, a shaping step may be provided such that unevenness of the transfer substrate is levelled by heat and pressing force by pressing the transfer substrate by two heating rollers.

What is claimed is:

1. A transfer substrate recycling apparatus comprising:
a first pass line in which an elongated belt-shaped transfer substrate wound in a roll shape is unwound and conveyed;
a second pass line in which an elongated belt-shaped adhesive material wound in a roll shape is unwound and conveyed;
a controlling portion configured to control the conveyance of the transfer substrate;
a first removal portion provided in the first pass line, the first removal portion being configured to remove an impurity on the transfer substrate by transferring the impurity onto the adhesive material such that the adhesive material is brought into contact with the transfer substrate;
an inspection portion provided on a downstream side from the first removal portion in the first pass line, the inspection portion being configured to inspect a surface of the transfer substrate; and
a second removal portion provided in the first pass line, the second removal portion being configured to remove a residual impurity detected by the inspection portion.

2. The transfer substrate recycling apparatus according to claim 1, wherein the controlling portion controls the conveyance of the transfer substrate such that, after the residual impurity is removed by the second removal portion, a part, of the transfer substrate, where the residual impurity has been detected is passed through the inspection portion again.

3. The transfer substrate recycling apparatus according to claim 1, wherein:
the inspection portion is provided on a downstream side from the second removal portion; and
when the inspection portion detects the residual impurity, the controlling portion conveys the transfer substrate in a reverse direction such that a part, of the transfer substrate, where the residual impurity has been detected is moved to the second removal portion.

4. The transfer substrate recycling apparatus according to claim 3, comprising an accumulation roller provided on a downstream side from the first removal portion but on an upstream side from the inspection portion and the second removal portion in the first pass line, wherein, when the transfer substrate is conveyed in the reverse direction, the transfer substrate is accumulated by changing a conveyance path length by moving the accumulation roller.

5. The transfer substrate recycling apparatus according to claim 1, wherein:
the inspection portion is provided on an upstream side from the second removal portion; and
after the residual impurity is removed by the second removal portion, the controlling portion conveys the transfer substrate in a reverse direction such that a part, of the transfer substrate, where the residual impurity has been detected moves to the inspection portion again.

6. The transfer substrate recycling apparatus according to claim 1, wherein:
the transfer substrate is polytetrafluoroethylene (PTFE); and
the impurity is a catalyst.

* * * * *